(12) United States Patent
Sukojo

(10) Patent No.: US 12,432,532 B2
(45) Date of Patent: Sep. 30, 2025

(54) METHODS AND SYSTEMS FOR TROUBLESHOOTING MOBILE DATA ISSUES AT A SUBSCRIBER DEVICE

(71) Applicant: T-Mobile Innovations LLC, Overland Park, KS (US)

(72) Inventor: Andiputranto Sukojo, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 397 days.

(21) Appl. No.: 18/188,358

(22) Filed: Mar. 22, 2023

(65) Prior Publication Data
US 2024/0323655 A1 Sep. 26, 2024

(51) Int. Cl.
*H04W 4/24* (2024.01)
(52) U.S. Cl.
CPC ..................... *H04W 4/24* (2013.01)
(58) Field of Classification Search
CPC ........ H04W 4/24; H04M 15/41; H04M 15/58
USPC ......................................... 455/406
See application file for complete search history.

(56) References Cited

U.S. PATENT DOCUMENTS

| | | | |
|---|---|---|---|
| 10,484,257 B1 * | 11/2019 | Louca | H04L 43/04 |
| 11,765,045 B1 * | 9/2023 | Nguyen | H04L 41/16 |
| | | | 709/224 |
| 2017/0353477 A1 * | 12/2017 | Faigon | G06F 21/6209 |

\* cited by examiner

*Primary Examiner* — Huy C Ho

(57) ABSTRACT

A troubleshooting system is configured to receive, from an unstructured supplementary service data (USSD) gateway (USSD-GW) in the core network, an instruction based on a USSD message indicating that a user equipment (UE) is experiencing a data issue, transmit, to the UE, a quick analysis message in response to the subscription usage data indicating that the data issue is related to the data usage and the subscription plan of the UE, transmit, to the UE, a deep analysis message in response to the network status data indicating that the data issue is related to the radio access network or the core network, and transmit, to a network operations center, a ticket describing the data issue occurring at the UE, wherein the ticket comprises at least a portion of the subscription usage data or the network status data.

20 Claims, 7 Drawing Sheets

METHODS AND SYSTEMS FOR TROUBLESHOOTING MOBILE DATA ISSUES AT A SUBSCRIBER DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers offer mobile data plans that may limit the maximum amount of bandwidth offered for cellular services, such that a data connection at the device may be disabled after a maximum amount of bandwidth has been met. Alternatively, the data plan may set a threshold amount, after which the network will slow the data connection speed for the user. In either case, a user of the device may experience cellular data issues while operating the device. For example, a data issue may occur when the device suddenly has a much slower data connection, or the data connection may suddenly stop working. While these data issues may occasionally arise due to the data usage exceeding the maximum or threshold amount specified in a subscription, this may not always be the case. Sometimes data issues arise due to unknown reasons, and troubleshooting may need to be performed to determine the cause of the data issue. To perform troubleshooting, the user may first perform one or more preliminary steps to resolve the issue, such as, for example, restarting the device or restarting the cellular data connection at the device. If the data issue persists, the user may then need to contact customer care of the service provider, either by telephone or directly at the retail store, to discuss the data issue with a customer service representative or employee of the service provider. However, the process of resolving such data issues with customer care may often be inconvenient, time-consuming, and resource intensive on both the user side and the service provider side.

SUMMARY

A method performed by a troubleshooting system for a user equipment (UE) is disclosed. The method comprises receiving, by the troubleshooting system in a core network, a message from the UE indicating that the UE is experiencing a data issue. Within a first period of time after receiving the message, the method comprises receiving, by the troubleshooting system, from at least one of a billing system or a Packet Network Data Gateway (PGW) in the core network, subscription usage data indicating whether the data issue is related to a data usage of the UE and a subscription plan associated with the UE, and transmitting, by the troubleshooting system, to the UE, a quick analysis message in response to the subscription usage data indicating that the data issue is related to the data usage and the subscription plan of the UE, wherein the quick analysis message describes the data issue as it relates to the data usage and the subscription plan of the UE. Within a second period of time after receiving the message, the method further comprises receiving, by the troubleshooting system, from at least one network element in a radio access network accessible by the core network, network status data indicating whether the data issue is related to the radio access network or the core network, and transmitting, by the troubleshooting system, to the UE, a deep analysis message in response to the network status data indicating that the data issue is related to the radio access network or the core network, wherein the deep analysis message describes the data issue as it relates to the radio access network or the core network. The method further comprises transmitting, by the troubleshooting system, to a network operations center, a ticket describing the data issue occurring at the UE, wherein the ticket comprises at least a portion of the subscription usage data or the network status data.

A method performed by a troubleshooting system for troubleshooting a data issue at a UE is disclosed. The method comprises receiving, by the troubleshooting system in a core network, from an unstructured supplementary service data (USSD) gateway (USSD-GW) in the core network, an instruction based on a USSD message indicating that the UE is experiencing a data issue, receiving, by the troubleshooting system, from at least one of a billing system or a packet network data gateway (PGW) in the core network, subscription usage data indicating whether the data issue is related to a data usage of the UE and a subscription plan associated with the UE, transmitting, by the troubleshooting system, to the UE, a quick analysis message in response to the subscription usage data indicating that the data issue is related to the data usage and the subscription plan of the UE, receiving, by the troubleshooting system, from at least one network element in a radio access network accessible by the core network, network status data indicating whether the data issue is related to the radio access network or the core network, transmitting, by the troubleshooting system, to the UE, a deep analysis message in response to the network status data indicating that the data issue is related to the radio access network or the core network, and transmitting, by the troubleshooting system, to a network operations center, a ticket describing the data issue occurring at the UE, wherein the ticket comprises at least a portion of the subscription usage data or the network status data.

A system comprising a core network is disclosed. The core network comprises at least one processor, at least one non-transitory memory, and a troubleshooting application. The troubleshooting application is stored in the at least one non-transitory memory, which when executed by the at least one processor, causes the at least one processor to be configured to receive, from an unstructured supplementary service data (USSD) gateway (USSD-GW) in the core network, an instruction based on a USSD message indicating that a user equipment (UE) is experiencing a data issue, receive, from at least one of a billing system or a packet network data gateway (PGW) in the core network, subscription usage data indicating whether the data issue is related to a data usage of the UE and a subscription plan associated with the UE, transmit, to the UE, a quick analysis message in response to the subscription usage data indicating that the data issue is related to the data usage and the subscription plan of the UE, receive, from at least one network element in a radio access network accessible by the core network, network status data indicating whether the data issue is related to the radio access network or the core network, transmit, to the UE, a deep analysis message in response to the network status data indicating that the data issue is related to the radio access network or the core network, and transmit, to a network operations center, a ticket describing the data issue occurring at the UE, wherein the ticket comprises at least a portion of the subscription usage data or the network status data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
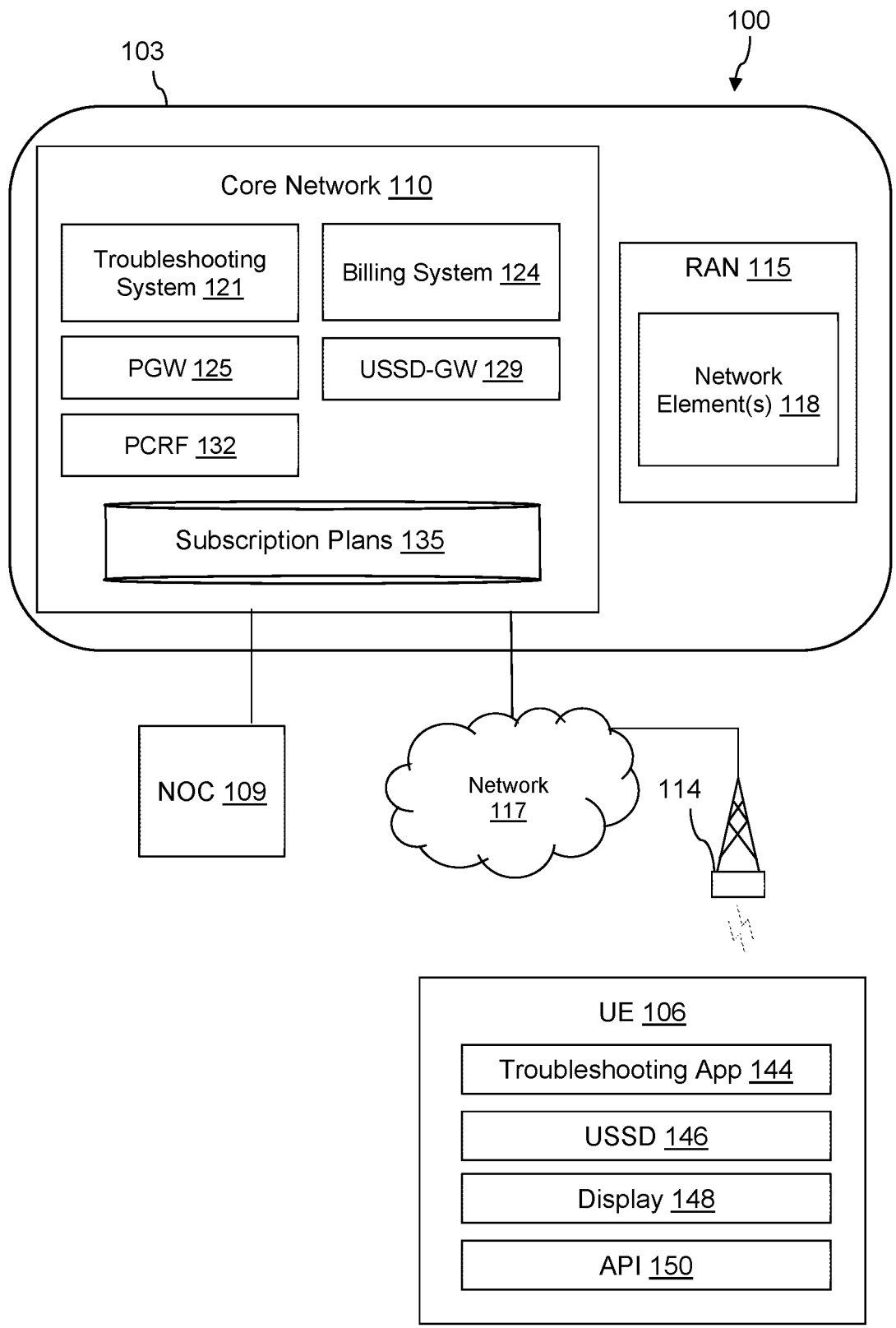
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Users may experience various types of cellular data issues on a device registered with the service provider according to a subscription plan. A data issue may refer to an issue related to the cellular connectivity of the device. For example, the data issue may be a slow speed connection, inability to browse the Internet at the device, a weak data signal at the device, intermittent data connection loss at the device, a data pass not working, etc.

As mentioned above, the current process of resolving such data issues is inconvenient, time-consuming, and resource intensive on both the user side and the service provider side. For example, the user may have to call customer care and speak to a customer care representative to resolve the issue. In this case, the customer care representative may verbally instruct the user to perform numerous steps on the device to diagnose at least one possible cause or source of the data issue. If a cause of the data issue is identified, the customer care representative then may provide one or more solutions to the data issue, if the solutions are readily known. Alternatively, the user may have to visit a retail store, wait in line at the retail store, and similarly discuss the data issue with an employee at the retail store. The employee may also manually determine a possible cause of the data issue, and then perform various different attempts at resolving the data issue until one attempt is successful.

Therefore, methods of resolving the data issues are inconvenient and time-consuming from both the user side and the service provider side. In addition, the representative at the service provider side may spend an enormous amount of time manually traversing all possible reasons the data issue may be occurring at the device. For example, the representative may search through various databases and systems at the core network, communicate with different applications and personnel at the service provider, communicate with operators or network elements (NE) in the radio access network (RAN), etc. to determine one or more factors causing the data issue. Therefore, the searches and communications used to perform troubleshooting of the data issue, taking into consideration that a service provider may support tens of millions of subscribers, consumes a heavy amount of power, processing, and networking resources. Moreover, certain data issues may require a deeper analysis of not just the device and an associated subscription plan, but also any possible outages or issues occurring in the underlying RAN. Such a deeper analysis is again resource-intensive in that the data used to perform the deeper analysis may be more difficult and time-consuming to locate or may be received over the network. All of this often leads to the possibility that the data issue never fully gets resolved, and the user may cancel the subscription plan with the service provider or switching to another service provider to avoid the hassle of dealing with the data issue.

The present disclosure addresses the foregoing technical problems by providing a technical solution in the technical field of data connection troubleshooting. In various embodiments, the troubleshooting system disclosed herein practically eliminates the user side tasks for troubleshooting the data issue, and instead offloads the majority of tasks for troubleshooting the data issue to the core network. In an embodiment, the device may only need to transmit a message, such as, for example, an unstructured supplementary service data (USSD) message, to the core network belonging to the service provider to trigger resolution of the data issue. The USSD message may include a standardized code indicating that the device is experiencing a data issue. In an embodiment, the USSD message may not contain any other information describing the data issue, putting the onus of identifying and resolving the data issue on the core network. However, in other embodiments, the message may contain information describing the data issue as experienced by the user of the device.

In an embodiment, the device may transmit the USSD message to a USSD gateway (USSD-GW) of the core network, and the USSD-GW may process the code in the USSD message and transmit an instruction to the troubleshooting system, triggering the troubleshooting system to identify and resolve the data issue occurring at the device. In one embodiment, the troubleshooting system may be one or more computing devices, including power, storage, networking, and processing resources used to implement the embodiments of troubleshooting disclosed herein. In another embodiment, the troubleshooting system may be an application comprised of instructions that may be executed by one or more processors in the core network to implement the embodiments of troubleshooting disclosed herein. In either case, the troubleshooting system is located or provisioned in the core network of a carrier network associated with the service provider.

The core network may include various other services and applications responsible for providing the data connection to the devices subscribed with the service provider, such as, for example, a billing system, a packet network data gateway (PGW), and a policy and charging rules function (PCRF). The core network may also include a database storing details regarding subscription plans associated with the devices subscribed with the service provider.

The carrier network may also include the underlying RAN, which may include the network elements and other resources used to provide the data connection to the devices subscribed with the service provider. A network operations center (NOC), stationed with several service provider employees, servers, memories, and other resources, may have access to all of the services and applications at the core network. The NOC may be responsible for manually troubleshooting, identifying, and resolving some of the more complex issues that may arise at the service provider.

In an embodiment, the troubleshooting system may perform at least three tiers of troubleshooting (e.g., issue identification and resolution), and each may be performed within certain time periods of receiving the initial message from the device. The first tier may be a quick analysis, the second tier may be a deep analysis, and the third tier may involve incident report or trouble ticket generation for the NOC.

The troubleshooting system may perform the quick analysis based on subscription usage data received from either the billing system or the PGW in the core network. The subscription usage data may indicate whether the data issue is related to a data usage of the device and a subscription plan associated with the device. For example, the subscription usage data may include at least one of subscription plan data, data usage thresholds, payment history data, notification history, data roaming constraint data, data plan metering data, device identification data, subscription account data, etc. The subscription plan data may be the subscription plan associated with the device and stored at the core network. The subscription plan data may indicate the data usage thresholds or maximum bandwidth usage permitted for the device according to the subscription plan, such that if the threshold or maximum bandwidth is exceeded by the device, the data connection of the device may be throttled or disabled. The subscription plan data may also indicate the data roaming constraint data, such as, for example, speed limitations while the device is roaming or time limitations for roaming on the device. According to the subscription plan, a roaming connection may be disabled or throttled when the device does not comply with the data roaming constraints. The data plan metering data may indicate metering or usage of various types of data connection services, such as, for example, home network usage, domestic roaming usage, international roaming inside/outside the network, tethering usage, etc. According to the subscription plan, the various types of data connection services may be disabled, throttled, or capped based on whether the metered usage meets one or more thresholds indicated in the subscription plan. The payment history may indicate, for example, whether the user has any outstanding balances on the account or is up-to-date on all payments on the account. When the account indicates outstanding overdue balances, the data connection may be disabled on the device, pursuant to the terms of the subscription plan. The device identification data and/or subscription account data may indicate other metrics by which the subscription plan may dictate when and how the data connection may be throttled or disabled. For example, the billing system may obtain the foregoing subscription usage data from the subscription plans stored at the core network. For example, the PGW may obtain the foregoing subscription usage data from a PGW session between the device and the PGW, or from one or more buckets maintained at the PCRF.

In an embodiment, the subscription usage data may be used to determine a cause of the data issue (i.e., perform the quick analysis). For example, the subscription usage data may be used to determine that the data usage is being throttled or disabled based on data usage thresholds indicated in the subscription plan. The subscription usage data may be used to determine that the data roaming usage of the device is being throttled or disabled based on a data roaming constraint indicated in the subscription plan. The subscription usage data may be used to determine that the data usage is being throttled or disabled based on a payment history of the user.

Once the quick analysis is performed and at least one potential cause of the data issue has been identified, the troubleshooting system may transmit a quick analysis message to the device. The quick analysis message may indicate the identified cause of the data issue and a resolution to the data issue, if possible. For example, if the identified cause is that the data usage is being throttled or disabled based on data usage thresholds indicated in the subscription plan, there may not be an immediate resolution for the data issue, since the thresholds have already been exceeded. Instead, one possible alternate route may be to recommend a higher-level data plan to the user that provides for a higher or unlimited bandwidth usage. In contrast, if the identified cause is that the data usage has been enabled because an outstanding invoice has not been paid, the suggested resolution may be to recommend or remind the user to pay the outstanding invoice. The quick analysis message may include the identified cause and the suggestion resolution, which may be displayed on a display of the device. In some embodiments, the entire quick analysis and sending of the quick analysis message may be performed within a first time period of receiving the message the device (e.g., one minute).

Next, the troubleshooting system may perform the deep analysis based on network status data received from at least one network element (NE) in the underlying RAN associated with the core network. The at least one NE may be, for example, a controller, router, switch, bridge, virtual private network (VPN), virtual function, etc., disposed in or provisioned at the RAN or in the core network. The NE may have access to the network status data of any or all of the network elements RAN, in which the network status data indicates whether an NE is properly function or failing, a congestion level at the NE, outstanding circumstances occurring at or near the NE, fair usage according to congestion level at the NE, permitted devices that may interact with the NE, compatible protocols by which data may be forwarded through the NE, coverage strength at the NE, etc. In an embodiment, the network status data may be used to determine a cause of the data issue (e.g., perform the deep analysis). For example, the network status data indicates the data usage is being throttled or disabled based on at least one of network congestion, a network outage, a natural event, signal strength, fair usage, or device compatibility with the RAN.

Once the deep analysis is performed and at least one potential cause of the data issue and a possible resolution is identified, the troubleshooting system may transmit a deep analysis message to the device. The deep analysis message may indicate the identified cause of the data issue and a resolution to the data issue, if possible. For example, if the identified cause is that the data usage is being throttled or disabled based on data network congestion in the area, there may not be an immediate resolution to the data issue. However, if the identified cause is that the data usage has been disconnected because of a fiber cut in the network, the suggested resolution may be to forward traffic for the device through another route in the RAN. The deep analysis message may include the identified cause and the suggested resolution, which may be displayed on a display of the device, within a first time period of receiving the message (e.g., three minutes). The suggested resolution may be displayed as an affirmative statement (e.g., "a failure has occurred in the network, another route will be used to forward traffic to your device") or may be displayed as a selective option for the user to select whether or not to use (e.g., "a failure has occurred in the network, please select "OK" to forward traffic along a best alternative path").

Whether or not a cause of the data issue has been identified using the quick analysis or deep analysis, the troubleshooting system may also generate a ticket to transmit to the NOC for further analysis and verification. The ticket may or may not include at least some of the subscription usage data and/or network status data determined during the quick analysis and the deep analysis. For example, the troubleshooting system may generate the ticket to include data identifying the device and the user behind the device, any data usage thresholds that may have been exceeded, and/or any network outages detected during the deep analysis. An operator at the NOC may manually continue to identify any other possible causes of the data issue and methods of resolving the data issue.

When the method of resolving the data issue involves a more time-consuming process, such as, for example, repairing a physical connection or link in the RAN, replacing a switch, waiting for network congestion to reduce, etc., the troubleshooting system may estimate a time to resolution and transmit the estimated time to resolution to the device. In an embodiment, the troubleshooting system may estimate the time to resolution based on a history of resolution times for similar data issues. For example, if network congestion is occurring because of a sports event, the troubleshooting system may maintain a record of network congestion and timing for historical sport events in the area, and use this record to estimate the time that it might take for the network congestion to relieve after a similar sports event.

In an embodiment, an operator at the NOC or service provider may also call the user of the device, for example, after completing all three tiers of troubleshooting, to verify that the data issue has been resolved, thereby ensuring the matter has been resolved while increasing customer satisfaction. In this way, the embodiments disclosed herein automate the complexities involved in identifying and resolving issues that may arise in a data connection of a device. By automating this process and offloading the computationally heavy tasks to the core network, the embodiments disclosed herein enable a far more resource efficient method for troubleshooting data issues at the device.

Turning now to FIG. 1, a communication system 100 is described. The system 100 comprises a carrier network 103, a user equipment (UE) 106, a cell site 114, and a network 117. The UE 106 may be communicatively coupled to the carrier network 103 and/or network 117 via the cell site 114.

The UE 106 may be a cell phone, a mobile phone, a smart phone, a personal digital assistant (PDA), an Internet of things (IoT) device, a wearable computer, a headset computer, a laptop computer, a tablet computer, or a notebook computer. In some embodiments, the UE 106 may be a mobile phone, as opposed to a tablet device, hotspot, or wireless router. The cell site 114 may provide the UE 106 a wireless communication link to the carrier network 103 and/or network 117 according to a 5G, a long term evolution (LTE), a code division multiple access (CDMA), or a global system for mobile communications (GSM) wireless telecommunication protocol.

The network 117 may be one or more private networks, one or more public networks, the Internet, or a combination thereof. While FIG. 1 shows the carrier network 103 as being separate from the network 117, it should be appreciated that, in some embodiments, at least a portion of the carrier network 103 may be part of the network 117. The carrier network 103 may be a network including a RAN 115 and a core network 110. The RAN 115 may include the access network containing the radio elements of a cell network. The RAN 115 may include one or more NEs 118, such as, for example, a controller, router, switch, bridge, VPN, virtual function, etc., disposed in or provisioned at the RAN 118. For example, the RAN 118 may be provisioned, configured, and monitored through a centralized system, using an NE 118. The NE 118 may receive a report detailing which radio station (NodeB), cell, or link is experiencing congestion or an outage.

The core network 110 may include the elements that manage the subscriber information, call setup and routing, and related system supports. In an embodiment, the core network 110 may be an evolved packet core (EPC) core network. The core network 110 may be configured to implement a 5G, a LTE, a CDMA, or a GSM wireless telecommunication protocol. In one embodiment, the core network 110 may be a 3rd Generation Partnership Project (3GPP) Evolved Packet System (EPS).

As shown in FIG. 1, the core network 110 includes the troubleshooting system 121, billing system 124, PGW 125, USSD-GW 129, and PCRF 132. The core network 110 may also include a database storing the subscription plans 135 associated with users that have subscribed one or more devices with the service provider. The USSD-GW 129 may be a gateway that receives the USSD message from the UE 106, in which the USSD message includes a code signaling that a data issue is being experienced at the UE 106. The USSD-GW 129 may then be triggered to transmit an instruction to the troubleshooting system 121, instructing the troubleshooting system 121 to begin identifying and resolving the data issue at the UE 106.

In an embodiment, the troubleshooting system 121 may be one or more computing devices, with power, storage, networking, and processing resources used to implement the embodiments of troubleshooting disclosed herein. In another embodiment, the troubleshooting system 121 may be an application comprised of instructions that may be executed by one or more processors in the core network to implement the embodiments of troubleshooting disclosed herein.

The PGW 125 is a gateway in the core network 110 that may allocate Internet Protocol (IP) addresses to the UE 106 during default bearer setup, such that the UE 106 may connect to multiple packet networks through multiple PGWs 125. In this way, the UE 106 may have an established PGW session with the PGW 125 such that the UE 106 may connect to other external networks. The PGW session may indicate the subscription usage data described above. The PGW 125 may also receive some of the subscription usage data from the PCRF 132. The PCRF 132 may be a service in the core network 110 responsible for service data flow detection, policy enforcement, and flow-based charging. The PCRF 132 may have access to one or more buckets (e.g., home network bucket, roaming bucket, data bucket, etc.) which may indicate the data plan metering data. The data plan metering data may indicate metering or usage of various types of data connection services, such as, for example, home network usage, domestic roaming usage, international roaming inside/outside the network, tethering usage, etc. A subscription plan 135 may be an agreement between an end user and the service provider, according to which the server provider agrees to provide the UE 106 belonging to the end user a set of services under the terms of the subscription plan 135. The end user receives the right to use the services and agrees to pay for these services per the agreement.

A NOC 109 may have access to the core network 110. The NOC may be stationed with several service provider employees, servers, memories, and other resources, and may have access to all of the services and applications at the core network 110. The NOC 109 may be responsible for manually identifying and resolving some of the more complex issues that may arise at the service provider.

The UE 106 includes a troubleshooting application 144, a display 148, one or more application programming interfaces (APIs) 150, and may be USSD 146 enabled. The troubleshooting application 144 may transmit the USSD message to the USSD-GW 129. The troubleshooting application 144 may also display the quick analysis message and deep analysis message received from the troubleshooting system 121 on a display 148 of the UE 106. The UE 106 may also communicate with the core network 110 using the APIs 150.

Figure 2:
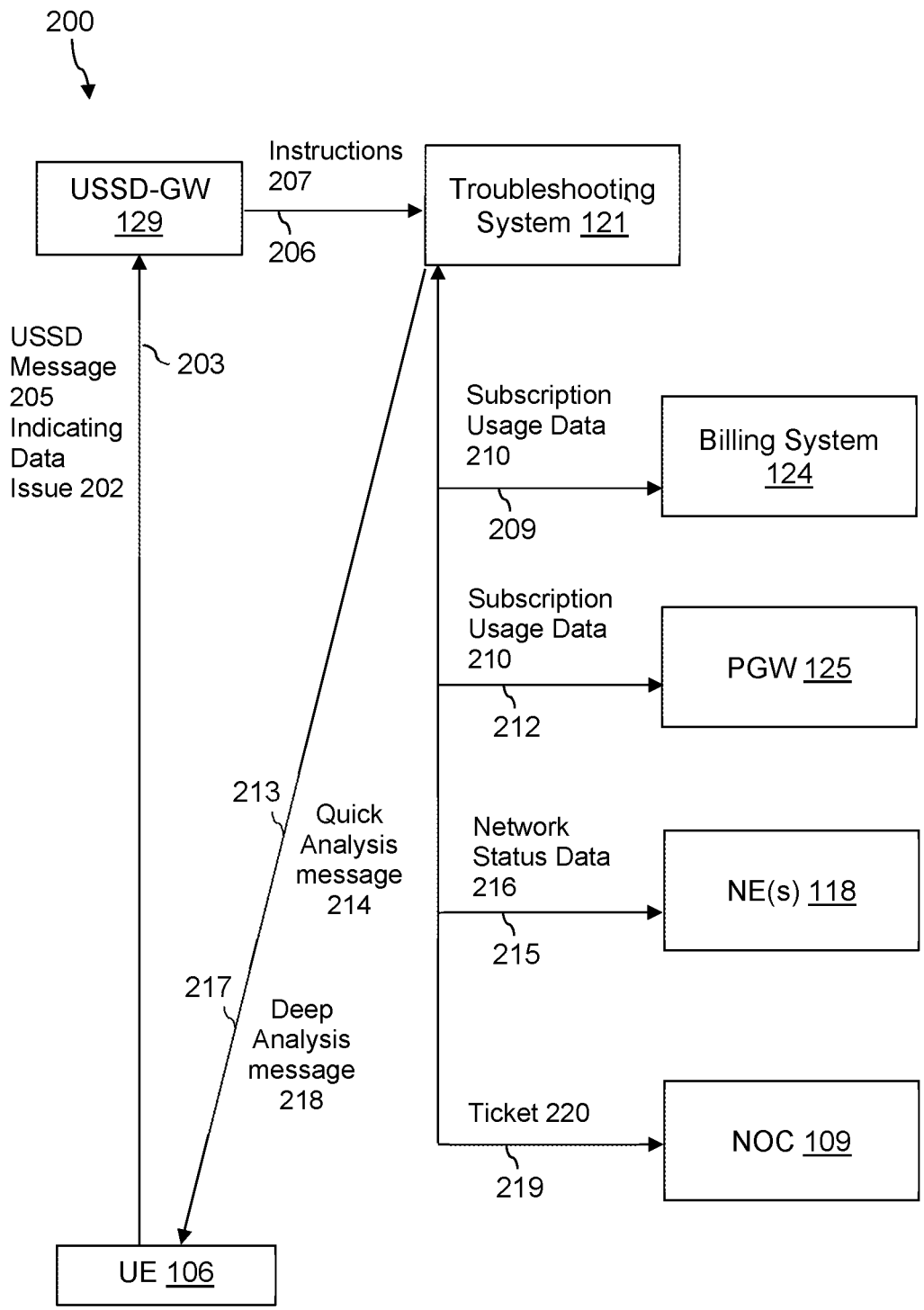
FIG. 2 is a block diagram of an example method performed by the communication system of FIG. 1 according to an embodiment of the disclosure.

Turning now to FIG. 2, a block diagram illustrating an example method 200 performed by the communication system 100 of FIG. 1 is described. Method 200 is performed by various components of the communication system 100, such as, for example, the UE 106, the USSD-GW 129, the troubleshooting system 121, the billing system 124, the PGW 125, one or more NEs 118 in the RAN 115, and the NOC 109. Method 200 may be performed in response to a user detecting that a data issue is occurring at the UE 106. For example, the data issue may be that the data connection is slower than usual or disabled, the roaming data connection is slower than usual or disabled, the UE 106 is unable to access certain sites, the UE 106 is unable to tether to another device, etc.

At step 203, the troubleshooting application 144 may transmit a USSD message 205 indicating that the data issue 202 is occurring at the UE 106 to the USSD-GW 129. The USSD message 205 may include a standardized code, such as, for example, "#863", assigned to indicate that the UE 106 is experiencing the data issue 202. The USSD message 205 may not contain any other information describing the data issue 202, or may contain information describing the data issue 202 as experienced by the user of the UE 106.

The USSD-GW 129 may receive the USSD message 205 and decode the code carried in the USSD message 205 to determine that the UE 106 is experiencing a data issue 102, which may be handled by the troubleshooting system 121. The USSD-GW 129 may store details regarding the USSD message 205 in a database accessible to the USSD-GW 129, in which the details may include an identity of the UE 106 and a time of receiving the USSD message 205.

At step 206, the USSD-GW 129 may generate and transmit instructions 207 to the troubleshooting system 121 in response to receiving the USSD message 205. The instructions 207 may identify the UE 106 and instruct the troubleshooting system 121 to troubleshoot (i.e., identify and resolve) the data issue 202 currently being experienced at the UE 106. For example, the instructions 207 may carry the International Mobile Station Equipment Identity (IMEI) or International Mobile Subscriber Identity (IMSI) of the UE 106.

Upon receiving the instructions 207, the troubleshooting system 121 may begin troubleshooting the data issue 202 in steps 209-217. At steps 209 and 212, the troubleshooting system 121 may first perform a quick analysis to determine possible causes of the data issue 202. The quick analysis may be performed based on subscription usage data 210 indicating whether the data issue 202 is related to a data usage of the UE 106 and a subscription plan 135 of the UE 106. As shown in FIG. 2, the subscription data usage 210 may be received from the billing system 124 and/or the PGW 125. For example, the billing system 124 may obtain the subscription usage data 210 based on the subscription plans 135 and current usage data stored at the core network 110. The PGW 125 may obtain the subscription usage data 210 from a PGW session between the UE 106 and the PGW 125. For example, a log detailing the PGW session may carry details related to the subscription usage data 210.

The subscription usage data 210 may include data related to a data consumption or usage of the UE 106, roaming usage of the UE 106, tethering performed by the UE 106, and a subscription plan associated with the UE 106. For example, the subscription usage data 210 may include or be based on at least one of subscription plan data, data usage thresholds, payment history data, notification history, data roaming constraint data, data plan metering data, device identification data, or subscription account data, as described above. As should be appreciated, the subscription usage data 210 may also include other types of data related to the UE 106 data consumption and the subscription plan 135.

In one embodiment, the billing system 124 and the PGW 125 may transmit the foregoing subscription usage data 210 to the troubleshooting system 121 for the troubleshooting system 121 to traverse through and determine a cause for the data issue 202. For example, the troubleshooting system 121 may receive a log of a PGW session between the UE 106 and the PGW 125. For example, the troubleshooting system 121 may be programmed to traverse through the PGW session log to identify a charging rule-based name (CBRN) defining a collection of traffic detected, actions, and functions performed by the UE 106 to identify whether a problematic action or function is being performed. Similarly, the troubleshooting system 121 may review the PGW session log to identify charging rule name (CRN), which is used to implement, for example, data throttling, free music, content control, un-throttling, etc. The troubleshooting system 121 may also review the PGW session log to determine a cell tower or radio to which the UE 106 is attached to, an IMEI of the device, data traffic of the UE 106, packet drops, etc. The IMEI of the UE 106 may be used to determine the specification of the UE 106 and to determine whether the UE 106 is compatible with the RAN 115. Similarly, PGW session log may also indicate a quality of service (QOS) class identifier, a mobile country code (MCC)-mobile network code (MNC) indicating whether the UE 106 is in the home network or roaming in a different operator or country. In this way, troubleshooting system 121 may use the PGW session log to identify possible issues contributing to the data issue 202 reported by the UE 106.

Similarly, the billing system 124 may also have access to the user PGW Charging Data Record (CDR), which indicates the data traffic of the UE 106. The troubleshooting system 121 may receive the CDR from the billing system 124 and search through the CDR to identify possible causes of the data issue 202.

In another embodiment, the subscription usage data 210 transmitted by billing system 124 and the PGW 125 to the troubleshooting system 121 may further include indications that a data connection of the UE 106 is being throttled, disabled, or capped because of discrepancies identified between the data usage of the UE 106 and the subscription plan 135. For example, the billing system 124 may receive a flag indicating that the user has reached a throttle cap or threshold from an Online Charging System (OCS). In this case, the troubleshooting system 121 may query a subscriber status (e.g., active or suspended) and any flags (e.g., throttle or depleted) from the billing system 124 based on a location of the UE 106. The billing system 124 may also maintain records regarding whether the user is enrolled in a new data plan or a data pass that may potentially have issues. The billing system 124 may maintain data indicating that multiple users using such a new data plan or data pass has similarly experienced a data issue 202. The billing system 124 may transmit this data to the troubleshooting system 121.

In an embodiment, the subscription usage data 210 may also indicate whether data usage or data roaming usage is being throttled or disabled based on the data usage of the UE 106 and the subscription plan 135 associated with the UE 106. For example, the subscription usage data 210 may indicate whether the data usage is being throttled or disabled based on data usage thresholds indicated in the subscription plan 135, whether data roaming usage of the UE 106 is being throttled or disabled based on data roaming constraint data indicated in the subscription plan 135, or whether the data usage is being throttled or disabled based on a payment history of the user.

The troubleshooting system 121 may also determine a potential resolution of the data issue 202, when possible. For example, the resolution may indicate that the data issue 202 would be resolved if the user pays an outstanding invoice, or that the data issue 202 would be resolved if the user moves into the home network. However, in some cases, the data issue 202 may not be immediately resolved. For example, the data issue 202 may have arisen because the UE 106 has exceeded the maximum bandwidth or threshold bandwidth permitted in accordance with the associated subscription plan 135. Alternatively, the data issue 202 may be occurring because the UE 106 is not permitted to have a roaming data connection according to the subscription plan 135. In such a case, troubleshooting system 121 may indicate the cause behind the data issue 202, without specifying a method of resolving the data issue 202.

At step 213, the troubleshooting system 121 may transmit a quick analysis message 214 to the UE 106 in response to determining that a cause of the data issue 202 may have been identified based on the subscription usage data 210. In an embodiment, the quick analysis message 214 may be transmitted to the UE 106 within a first period time, such as, for example, within one minute of receiving the instructions 207. The quick analysis message 214 may include text describing the identified cause of the data issue 202, the determined resolution for the data issue 202, if the data issue 202 can indeed be resolved within a reasonable time period, and/or the identified cause behind the data issue 202. The UE 106 may display the text obtained from the quick analysis message 214 on a display 148, to efficiently inform the user of a potential cause of the data issue 202 and steps to resolving the data issue 202, if applicable.

At step 215, the troubleshooting system 121 may perform the deep analysis to determine one or more other possible causes of the data issue 202, regardless of whether another cause or resolution was previously identified during the quick analysis steps 209 and 212. The deep analysis may be performed based on the network status data 216 indicating whether the data issue 202 is related to the RAN 115 or the core network 110. As shown in FIG. 2, the network status data 216 may be received from one or more NEs 118 in the RAN 115. The NE 118 may be provisioned, configured, and monitored through a centralized system to have access to the network status data 216 of any or all of the network elements 118. The NE 118 may receive a report as regarding the status of cell towers, radio station, congestion along links, failure at links, etc. The NE 118 may collect data regarding which access point various subscribers are attached to, and which cell the subscribers are located in, which may be used to determine network congestion as well. The NE 118 may identify any issues in the RAN 115 and identify weak coverage areas or weak signal strength areas in the RAN 115. The NE 118 may also determine various specifications (e.g., frequency band) supported by UEs 108, to determine whether the specification of the UE 106 is not supported by the elements in the RAN 115.

The NE 118 may generate the network status data 216 indicating a status of one or more elements in the RAN 115 or core network 110. The status may refer to whether an element of the RAN 115 is properly function or failing, a congestion level at the element, outstanding circumstances occurring at or near the element, fair usage according to congestion level at the element, permitted devices that may interact with the element, compatible protocols by which data may be forwarded through the element, coverage strength at the element, etc.

In this way, the deep analysis may be performed to provide a more in-depth analysis of the potential causes of the data issue 202 and the UE 106. The troubleshooting system 121 may also determine a potential resolution of the data issue 202, when possible, and provide an estimated time-to-resolution if the method of resolving the data issue 202 is to be performed at the RAN 115 or core network 110. For example, methods of resolving the data issue 202 that may be performed by a local engineer or operator of the RAN 115 may include, for example, repairing a connection, replacing a switch, waiting for network congestion to reduce, etc. In an embodiment, the troubleshooting system 121 may estimate the time-to-resolution based on a history of resolution times for similar data issues. For example, if network congestion is occurring because of a sports event, the troubleshooting system 121 may maintain a record of network congestion and timing for prior sport events in the area, and use this record to estimate the time that it might take for the network congestion to relieve after a similar sports event.

At step 217, the troubleshooting system 121 may transmit a deep analysis message 218 to the UE 106 in response to determining a cause of the data issue 202 using the network status data 216. In an embodiment, the deep analysis message 218 may be transmitted to the UE 106 within a second period of time, such as, for example, within three minutes of receiving the instructions 207. In an embodiment, the second time period during which the deep analysis message 218 is sent is longer than the first time period during which the quick analysis message 214 is sent. In other words, the quick analysis message 214 is sent to the UE 106 in less than half the time it takes for the deep analysis message 218 to be sent to the UE 106.

The deep analysis message 218 may include text describing the identified cause of the data issue 202, a determined resolution for the data issue 202, if applicable, and/or the estimated time-to-resolution if the data issue 202 is to be resolved at the RAN 115 or core network 110. The UE 106 may display the text obtained from the deep analysis message 218 on a display 148, to efficiently inform the user of a potential cause of the data issue 202 and steps for resolving the data issue 202, if applicable.

At step 219, the troubleshooting system 121 may generate a ticket 220 based on the data issue 202 occurring at the UE 106. In one embodiment, the troubleshooting system 121 only performs step 219 if the data issue 202 was not resolved in steps 209-217. In another embodiment, the troubleshooting system 121 performs step 219 regardless of whether the cause of the data issue 202 was identified in the quick analysis or in the deep analysis. The ticket 220 may be transmitted to the NOC 109 for further analysis or verification. The ticket 220 may or may not include at least some of the subscription usage data 210 and/or network status data 216 determined during the quick analysis and the deep analysis. For example, the troubleshooting system 121 may generate the ticket 220 to include data identifying the UE 106 and the user behind the UE 106, any data usage thresholds that may have been exceeded, and/or any network outages detected during the deep analysis. An operator at the NOC 109 may manually continue to identify any other possible causes of the data issue 202 and methods of resolving the data issue 202. Once the NOC 109 identifies and resolves the data issue 202, an operator at the NOC 109 may reach out to the user to verify that the data issue 202 has in fact been properly resolved. For example, the operator at the NOC 109 may send the user a text message or email, or reach out the user by telephone to verify data issue 202 resolution.

Figure 3:
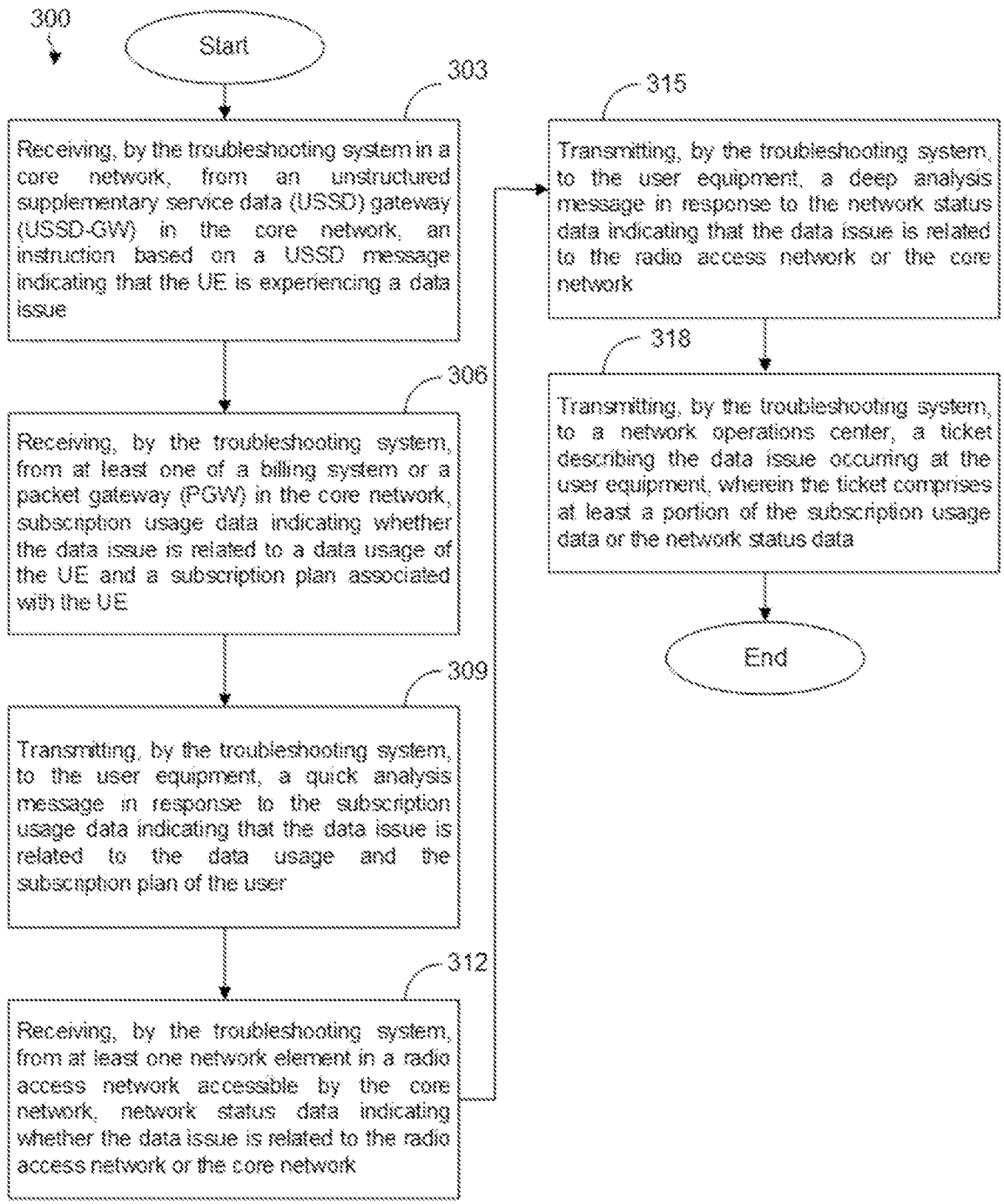
FIG. 3 is a flow chart of a first method performed by the system of FIG. 1 according to an embodiment of the disclosure.

Turning now to FIG. 3, a method 300 is described. Method 300 is performed by the troubleshooting system 121 in the communications system 100 of FIG. 1. Method 300 may be performed in response to a user operating the UE 106 detecting that a data issue 202 is occurring at the UE 106.

At step 303, method 300 comprises receiving, by the troubleshooting system 121 in a core network 110, from a USSD-GW 129 in the core network 110, an instruction 207 based on a USSD message 205 indicating that the UE 106 is experiencing a data issue 202. At step 306, method 300 comprises receiving, by the troubleshooting system 121, from at least one of a billing system 124 or a PGW 125 in the core network 110, subscription usage data 210 indicating whether the data issue 202 is related to a data usage of the UE 106 and a subscription plan 135 associated with the UE 106.

At step 309, method 300 comprises transmitting, by the troubleshooting system 121, to the UE 106, a quick analysis message 214 in response to the subscription usage data 210 indicating that the data issue 202 is related to the data usage and the subscription plan 135 of the user. At step 312, method 300 comprises receiving, by the troubleshooting system 121, from at least one NE 118 in the RAN 115 accessible by the core network 110, network status data 216 indicating whether the data issue 202 is related to the RAN 115 or the core network 110. At step 315, method 300 comprises transmitting, by the troubleshooting system 121, to the UE 106, a deep analysis message 218 in response to the network status data 216 indicating that the data issue 202 is related to the RAN 115 or the core network 110. At step 318, method 300 comprises transmitting, by the troubleshooting system 121, to a NOC 109, a ticket 220 describing the data issue 202 occurring at the UE 106. In an embodiment, the ticket 202 comprises at least a portion of the subscription usage data 210 or the network status data 216.

In some embodiments, method 300 may comprise additional attributes and steps not otherwise shown in FIG. 3. The USSD message 205 comprises a code indicating that the UE 106 is experiencing the data issue 202 and triggering the USSD-GW 129 to transmit the instructions 207 to the troubleshooting system 121. The quick analysis message 214 is transmitted to the UE 106 within one minute of receiving the instruction 207, and the deep analysis message 218 is transmitted to the UE 106 within three minutes of receiving the instruction 207. The subscription usage data 210 is based on at least one of subscription plan data, data usage thresholds, payment history data, notification history, data roaming constraint data, data plan metering data, device identification data, or subscription account data. The subscription usage data 210 is based on a PGW session between the PGW 125 and the UE 106. The subscription usage data 210 indicates at least one of: the data usage is being throttled or disabled based on data usage thresholds indicated in the subscription plan 135, data roaming usage of the UE 106 is being throttled or disabled based on roaming constraints indicated in the subscription plan 135, or the data usage is being throttled or disabled based on a payment history of the subscriber. The network status data 216 indicates the data usage is being throttled or disabled based on at least one of network congestion, a network outage, a natural event, signal strength, fair usage, or device compatibility with the RAN 115.

Figure 4:
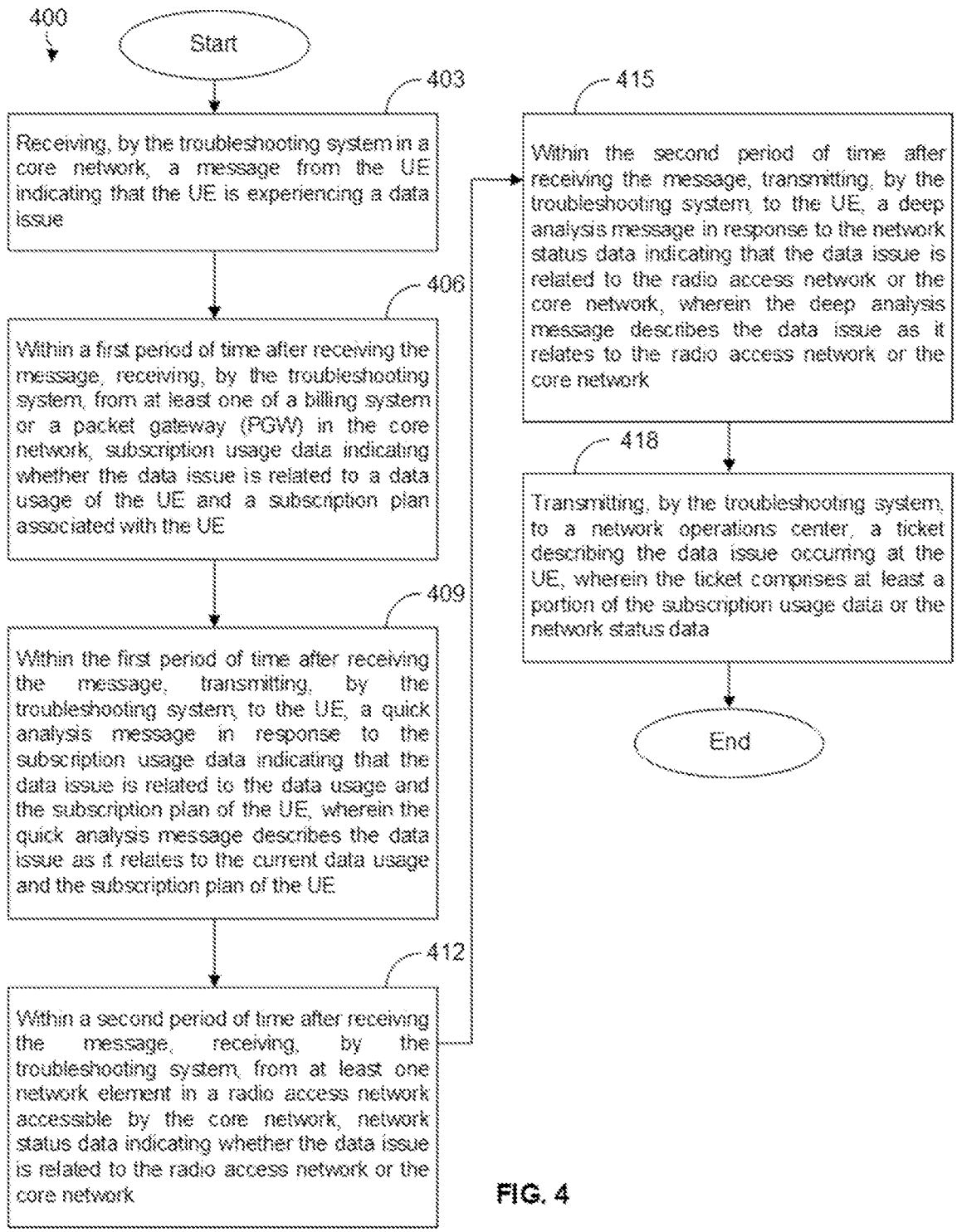
FIG. 4 is a flow chart of a second method performed by the system of FIG. 1 according to an embodiment of the disclosure.

Turning now to FIG. 4, a method 400 is described. Method 400 is performed at least by the troubleshooting system 121 in the communications system 100 of FIG. 1. Method 400 may be performed in response to a user operating the UE 106 detecting that a data issue 202 is occurring at the UE 106.

At step 403, method 400 comprises receiving, by the troubleshooting system 121 in a core network 110, a message (e.g., instruction 207) from the UE 106 indicating that the UE 106 is experiencing a data issue 202. Within a first period of time after receiving the message, method 400 may comprise steps 406 and 409. At step 406, method 400 comprises receiving, by the troubleshooting system 121, from at least one of a billing system 124 or a PGW 125 in the core network 110, subscription usage data 210 indicating whether the data issue 202 is related to a data usage of the UE 106 and a subscription plan 135 associated with the UE 106. At step 409, method 400 comprises transmitting, by the troubleshooting system 121, to the UE 106, a quick analysis message 214 in response to the subscription usage data 210 indicating that the data issue 202 is related to the data usage and the subscription plan 135 of the UE 106. In an embodiment, the quick analysis message 214 describes the data issue 202 as it relates to the current data usage and the subscription plan 135 of the UE 106.

Within a second period of time after receiving the message, method 400 may comprise steps 412 and 415. At step 412, method 400 comprises receiving, by the troubleshooting system 121, from at least one NE 118 in the RAN 115 accessible by the core network 110, network status data 216 indicating whether the data issue 202 is related to the RAN 115 or core network 110. At step 415, method 400 comprises transmitting, by the troubleshooting system 121, to the UE 106, a deep analysis message 218 in response to the network status data 216 indicating that the data issue 202 is related to the RAN 115 or core network 110. In an embodiment, the deep analysis message 218 describes the data issue 202 as it relates to the RAN 115 or the core network 110. At step 418, method 400 comprises transmitting, by the troubleshooting system 121, to a NOC 109, a ticket 220 describing the data issue 202 occurring at the UE 106. In an embodiment, the ticket 220 comprises at least a portion of the subscription usage data 210 or the network status data 216.

Figure 5A:
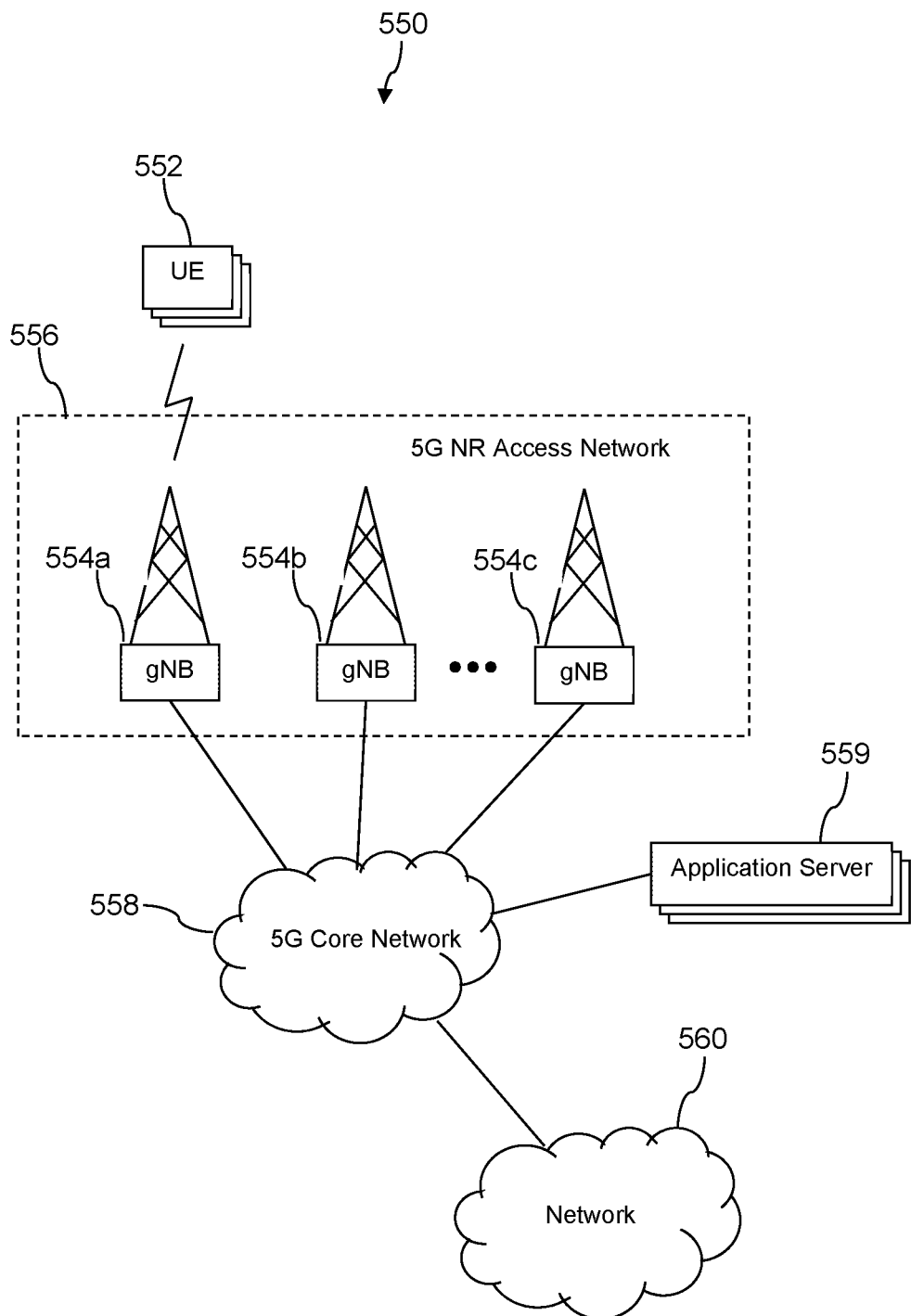
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the UE 106, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
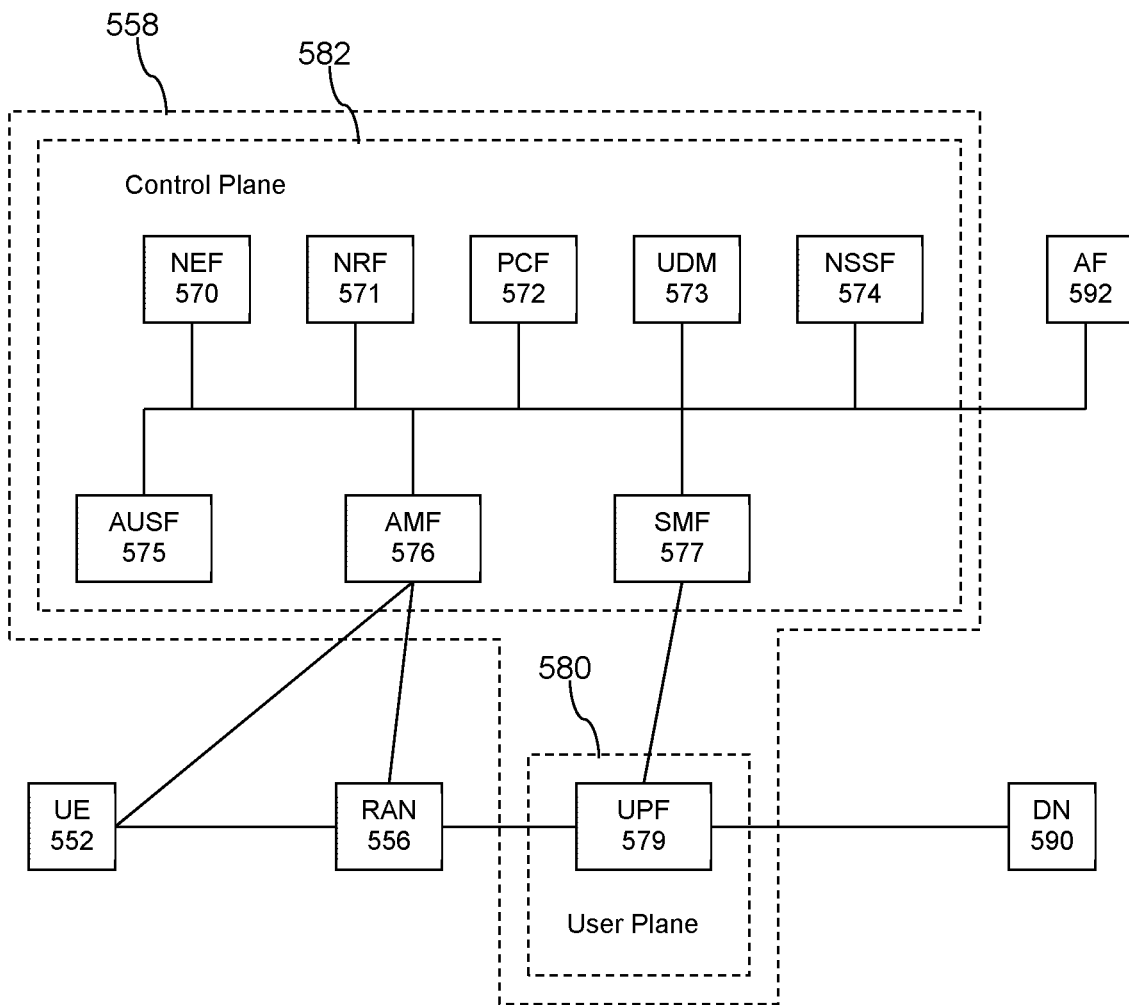

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
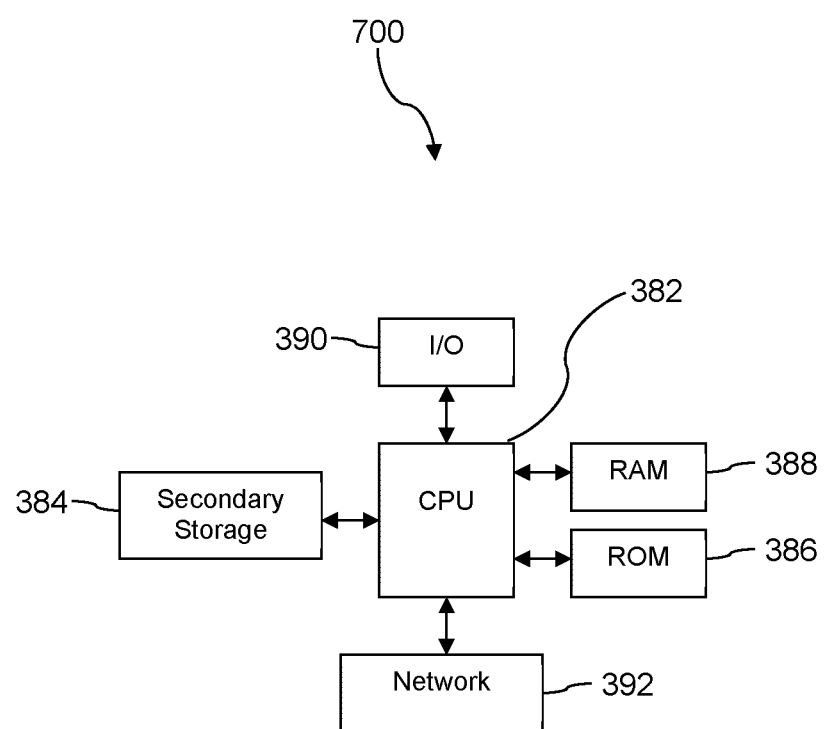
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the UE 106, the core network 110, and/or the core authentication application 128 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a troubleshooting system for troubleshooting a data issue at a user equipment (UE), wherein the method comprises:
   receiving, by the troubleshooting system in a core network, from an unstructured supplementary service data (USSD) gateway (USSD-GW) in the core network, an instruction based on a USSD message indicating that the UE is experiencing a data issue;
   receiving, by the troubleshooting system, from at least one of a billing system or a packet network data gateway (PGW) in the core network, subscription usage data indicating whether the data issue is related to a data usage of the UE and a subscription plan associated with the UE;
   transmitting, by the troubleshooting system, to the UE, a quick analysis message in response to the subscription usage data indicating that the data issue is related to the data usage and the subscription plan of the UE;
   receiving, by the troubleshooting system, from at least one network element in a radio access network accessible by the core network, network status data indicating whether the data issue is related to the radio access network or the core network;
   transmitting, by the troubleshooting system, to the UE, a deep analysis message in response to the network status data indicating that the data issue is related to the radio access network or the core network; and
   transmitting, by the troubleshooting system, to a network operations center, a ticket describing the data issue occurring at the UE, wherein the ticket comprises at least a portion of the subscription usage data or the network status data.

2. The method of claim 1, wherein the USSD message comprises a code indicating that the UE is experiencing the data issue and triggering the USSD-GW to transmit the instruction to the troubleshooting system.

3. The method of claim 1, wherein the quick analysis message is transmitted to the UE within one minute of receiving the instruction, and wherein the deep analysis message is transmitted to the UE within three minutes of receiving the instruction.

4. The method of claim 1, wherein the subscription usage data is based on at least one of subscription plan data, data usage thresholds, payment history data, notification history, data roaming constraint data, data plan metering data, device identification data, or subscription account data.

5. The method of claim 1, wherein the subscription usage data is based on a PGW session between the PGW and the UE.

6. The method of claim 1, wherein the subscription usage data indicates at least one of:
   the data usage is being throttled or disabled based on data usage thresholds indicated in the subscription plan;
   data roaming usage of the UE is being throttled or disabled based on roaming constraints indicated in the subscription plan; or
   the data usage is being throttled or disabled based on a payment history of a user operating the UE.

7. A system comprising:
   a core network comprising:
      at least one processor;
      at least one non-transitory memory; and a troubleshooting application, stored in the at least one non-transitory memory, which when executed by the at least one processor, causes the at least one processor to be configured to:
    receive, from an unstructured supplementary service data (USSD) gateway (USSD-GW) in the core network, an instruction based on a USSD message indicating that a user equipment (UE) is experiencing a data issue;
    receive, from at least one of a billing system or a packet network data gateway (PGW) in the core network, subscription usage data indicating whether the data issue is related to a data usage of the UE and a subscription plan associated with the UE;
    transmit, to the UE, a quick analysis message in response to the subscription usage data indicating that the data issue is related to the data usage and the subscription plan of the UE;
    receive, from at least one network element in a radio access network accessible by the core network, network status data indicating whether the data issue is related to the radio access network or the core network;
    transmit, to the UE, a deep analysis message in response to the network status data indicating that the data issue is related to the radio access network or the core network; and
    transmit, to a network operations center, a ticket describing the data issue occurring at the UE, wherein the ticket comprises at least a portion of the subscription usage data or the network status data.

8. The system of claim 7, wherein the USSD message comprises a code indicating that the UE is experiencing the data issue and triggering the USSD-GW to transmit the instruction to the troubleshooting application.

9. The system of claim 7, wherein the quick analysis message is transmitted to the UE within one minute of the instruction being received, and wherein the deep analysis message is transmitted to the UE within three minutes of the instruction being received.

10. The system of claim 7, wherein the subscription usage data is based on at least one of subscription plan data, data usage thresholds, payment history data, notification history, data roaming constraint data, data plan metering data, device identification data, or subscription account data.

11. The system of claim 7, wherein the subscription usage data is based on a PGW session between the PGW and the UE.

12. The system of claim 7, wherein the subscription usage data indicates at least one of:
    the data usage is being throttled or disabled based on data usage thresholds indicated in the subscription plan;
    data roaming usage of the UE is being throttled or disabled based on roaming constraints indicated in the subscription plan; or
    the data usage is being throttled or disabled based on a payment history of a user operating the UE.

13. The system of claim 7, wherein the network status data indicates the data usage is being throttled or disabled based on at least one of network congestion, a network outage, a natural event, signal strength, fair usage, or device compatibility with the radio access network.

14. A method performed by a troubleshooting system for troubleshooting a user equipment (UE), wherein the method comprises:
    receiving, by the troubleshooting system in a core network, a message from the UE indicating that the UE is experiencing a data issue;
    within a first period of time after receiving the message:
        receiving, by the troubleshooting system, from at least one of a billing system or a packet network data gateway (PGW) in the core network, subscription usage data indicating whether the data issue is related to a data usage of the UE and a subscription plan associated with the UE; and
        transmitting, by the troubleshooting system, to the UE, a quick analysis message in response to the subscription usage data indicating that the data issue is related to the data usage and the subscription plan of the UE, wherein the quick analysis message describes the data issue as it relates to the data usage and the subscription plan of the UE;
    within a second period of time after receiving the message:
        receiving, by the troubleshooting system, from at least one network element in a radio access network accessible by the core network, network status data indicating whether the data issue is related to the radio access network or the core network; and
        transmitting, by the troubleshooting system, to the UE, a deep analysis message in response to the network status data indicating that the data issue is related to the radio access network or the core network, wherein the deep analysis message describes the data issue as it relates to the radio access network or the core network; and
    transmitting, by the troubleshooting system, to a network operations center, a ticket describing the data issue occurring at the UE, wherein the ticket comprises at least a portion of the subscription usage data or the network status data.

15. The method of claim 14, wherein the message is received as an unstructured supplementary service data (USSD) message from a USSD gateway (USSD-GW) at the core network, wherein the USSD message comprises a code indicating that the UE is experiencing the data issue and triggering the USSD-GW to transmit the message to the troubleshooting system.

16. The method of claim 14, wherein the first period of time is less than the second period of time.

17. The method of claim 14, further comprising obtaining, by the billing system, the subscription usage data based on at least one of subscription plan data, data usage thresholds, payment history data, notification history, data roaming constraint data, data plan metering data, device identification data, or subscription account data.

18. The method of claim 14, further comprising obtaining, by the PGW, the subscription usage data based on a PGW session between the PGW and the UE.

19. The method of claim 14, wherein the subscription usage data indicates at least one of:
    the data usage is being throttled or disabled based on data usage thresholds indicated in the subscription plan;
    data roaming usage of the UE is being throttled or disabled based on roaming constraints indicated in the subscription plan; or
    the data usage is being throttled or disabled based on a payment history of a user operating the UE.

20. The method of claim 14, wherein the network status data indicates the data usage is being throttled or disabled based on at least one of network congestion, a network outage, a natural event, signal strength, fair usage, or device compatibility with the radio access network.

* * * * *